(12) United States Patent
Boutant et al.

(10) Patent No.: US 8,989,500 B2
(45) Date of Patent: Mar. 24, 2015

(54) METHOD FOR EXTRACTING RANDOM SIGNATURES FROM A MATERIAL ELEMENT AND METHOD FOR GENERATING A DECOMPOSITION BASE TO IMPLEMENT THE EXTRACTION METHOD

(71) Applicants: Yann Boutant, Aix-les-bains (FR); Thierry Fournel, Saint-galmier (FR); Jean-Marie Becker, Saint-etienne (FR)

(72) Inventors: Yann Boutant, Aix-les-bains (FR); Thierry Fournel, Saint-galmier (FR); Jean-Marie Becker, Saint-etienne (FR)

(73) Assignee: Signoptic Technologies, Le Bourget du Lac (FR)

( * ) Notice: Subject to any disclaimer, the term of this patent is extended or adjusted under 35 U.S.C. 154(b) by 232 days.

(21) Appl. No.: 13/685,168

(22) Filed: Nov. 26, 2012

(65) Prior Publication Data

US 2013/0114903 A1 May 9, 2013

Related U.S. Application Data

(62) Division of application No. 12/086,871, filed as application No. PCT/EP2006/070183 on Dec. 22, 2006, now Pat. No. 8,325,971.

(60) Provisional application No. 60/774,618, filed on Feb. 21, 2006.

(30) Foreign Application Priority Data

Dec. 23, 2005 (FR) ..................... 05 13231
Feb. 15, 2006 (FR) ..................... 06 01342

(51) Int. Cl.
*G06K 9/46* (2006.01)
*G06K 9/52* (2006.01)
(Continued)

(52) U.S. Cl.
CPC ............. *G06K 9/52* (2013.01); *G06K 9/00577* (2013.01); *G06K 19/06046* (2013.01); *G06F 7/588* (2013.01)
USPC ....................................... 382/190

(58) Field of Classification Search
None
See application file for complete search history.

(56) References Cited

U.S. PATENT DOCUMENTS 5,354,097 A   10/1994  Tel
5,521,984 A   5/1996   Denenberg et al.
(Continued)

FOREIGN PATENT DOCUMENTS

FR    2 866 139    8/2005
FR    2 870 376    11/2005
(Continued)

OTHER PUBLICATIONS

Y. Boutant et al., "Randomness analysis of images of aggregates" (2005) Signals, Circuits and Systems, pp. 75-78 (XP010837685).
(Continued)

*Primary Examiner* — Atiba O Fitzpatrick
(74) *Attorney, Agent, or Firm* — Clark & Brody

(57) ABSTRACT

The present invention concerns a method for extracting a random signature from a subject material element, comprising:
a phase to generate at least one acquisition vector of structural characteristics of at least one region of the subject material element,
a phase to generate at least one random signature vector from the acquisition vector, the random signature vector comprising:
at least one random component having a stable nature so that its value may be found on each implementation of the method on one same region of the subject material element,
and/or at least one random component having an unstable nature so that its value is likely to vary random fashion on each implementation of the method on one same region of the subject material element,
use of the random signature vector as random signature.

19 Claims, 10 Drawing Sheets

(51) Int. Cl.
*G06K 9/00* (2006.01)
*G06K 19/06* (2006.01)
*G06F 7/58* (2006.01)

(56) References Cited

U.S. PATENT DOCUMENTS

2005/0257064 A1 11/2005 Boutant et al.
2005/0262350 A1 11/2005 Boutant et al.

FOREIGN PATENT DOCUMENTS

| WO | 97/24699 | 7/1997 |
| WO | 2005/078651 A2 | 8/2005 |
| WO | 2005/122100 A1 | 12/2005 |

OTHER PUBLICATIONS

D. Jeulin, "Random texture models for material structures", Statistics and Computing, (2000) No. 10, 121-132.

Cs ⎡ p : 29641333159747119528017
   ⎢ q : 20778481927166671218361
   ⎢ n : 615901905356931684114789366903153888664320137
   ⎣ d : 277300113239345456813305493259190872752712833
Cp ⎣ e : 65537 xpv4mqe82xheg5pf ← 40                    ← 41
7zryrv0yw63v3felwurz1con6m5ls

METHOD FOR EXTRACTING RANDOM SIGNATURES FROM A MATERIAL ELEMENT AND METHOD FOR GENERATING A DECOMPOSITION BASE TO IMPLEMENT THE EXTRACTION METHOD

The present application is a Divisional of U.S. Ser. No.12/086,871 filed on May 22, 2009, which is a national phase of PCT/EP2006/070183 filed on Dec. 22, 2006, which claims the priority of French patent applications FR05/13231, FR 06/01342 and U.S. provisional application 60/774,618 which are hereby incorporated by reference.

The present invention concerns the technical area of signature extraction from a subject material element, either with a view to identifying this subject material element, or with a view to using the extracted signature in a process dependent on the subject material element or independent of this subject material element.

The problem with the signature of a subject material element lies in the need to guarantee the unicity of this signature, so as to be sure or nearly sure that two separate material elements will have two different signatures irrespective of the size of the sample of the two subject material elements.

The invention proposes achieving this objective of signature unicity by extracting this signature from structural characteristics of the subject material element. By structural characteristics of the subject material element is meant in particular the internal and/or external geometric or morphological characteristics, optionally associated with characteristics of chemical or physicochemical composition, colour, structure or others related to their location in space on the subject material element. The structural characteristics used by the invention are those which may be generated by stimulation of a material element and acquired by one or more suitable sensors.

Therefore, the invention concerns a method for extracting a random signature from a subject material element, comprising:
  application of a decomposition base,
  a generating phase to generate at least one acquisition vector of structural characteristics of at least one region in the subject material element,
  a decomposition phase of each acquisition vector in accordance with the decomposition base to obtain an image vector containing random components which each correspond to the contribution in the acquisition vector of a decomposition vector belonging to the decomposition base,
  a generating phase to generate at least one random signature vector which comprises the same number of components or less than the number of random components in each image vector, each component of the random signature vector being obtained by extraction and/or processing of at least one random component of at least one image vector,
  use of the random signature vector as random signature.

According to the invention, the result of the method is qualified as a random signature since, firstly, it has all the characteristics of a signature, and in particular that of unicity for each subject material element and more particularly for each region of the subject material element, and secondly the constituent components of the random signature vector are near-independent and near-equiprobable, even independent and equiprobable.

The method of the invention therefore sets itself apart from other signature generating methods in that the signature has a pure or near-pure random nature and is extracted from a subject material element via a signal, preferably a two-dimensional multidimensional signal called « image-signal» after decomposition in a « base» , the base itself possibly being generated from the same material element or from a different material element.

Unlike prior art methods, the method subject of the invention proceeds by reducing the image-signal without any major algorithmic operation being required after extraction.

The invention also concerns a method for extracting a random signature from a subject material element, comprising:
  a generating phase to generate at least one acquisition vector of structural characteristics of at least one region of the subject material element,
  a generating phase to generate at least one random signature vector from the acquisition vector, the random signature vector comprising:
    at least one random component of a stable nature so that its value is able to be found on each implementation of the method on one same region of the subject material element,
    and/or at least one random component of unstable nature so that its value is likely to vary random fashion on each implementation of the method on one same region of the subject material element.
  use of the random signature vector as random signature.

Generation of the random signature may be made by decomposition using a decomposition base as explained previously, or using any other method suitable for signal processing such as autocorrelation for example. Unlike the prior art, the random signature of the invention, in particular regarding the stable part, is not dependent on the processing or algorithm used but on the very structure of the subject material element.

In one preferred embodiment, the random signature vector comprises at least one stable random component and at least one unstable random component.

According to one characteristic of the invention, the generation phase of at least one acquisition vector comprises the following steps:
  generating at least one acquisition, according to an acquisition window, of structural characteristics of one region of the subject material element,
  digitizing, over a scanning path, each acquisition into an acquisition vector.

Insofar as a particular acquisition window is used, the method for extracting a random signature may comprise a determination step to define the characteristics of the acquisition window. Therefore, during this step to determine the characteristics of the acquisition window, it is possible in particular to choose the dimensions and/or form of the acquisition window which then becomes a parameter for implementing the random signature extraction method.

Similarly, insofar as a particular scanning path is used, the method for extracting a random signature may comprise a determination step to define the characteristics of the scanning path. Therefore, during the step to define characteristics of the scanning path, it may be chosen to read the data of the acquisition window in rows by horizontal scanning, or in columns using vertical scanning, or for example using a combination of vertical scanning and horizontal scanning.

According to one characteristic of the method for extracting a random signature, quantification is performed during the generation phase of a random signature vector so that each random component of the random signature vector is able to present a finite number of values or levels.

According to another characteristic of the inventive method for extracting a random signature, during the generation phase of at least one acquisition vector, n acquisition vectors are generated of one same region of the subject material element, and n image vectors are used each corresponding to an acquisition vector.

When using the n acquisition vectors of one same region of the subject material element and applying the decomposition of the acquisition vectors into image vectors in the decomposition base, according to one characteristic of the random signature extraction method and during the generation phase of at least one random signature vector:
  quantification is performed so that each random component of the random signature vector is able to present a finite number of values or levels of quantification which correspond to statistical classes,
  the value or level of each component of the random signature vector is defined by the result of the tests and/or statistical processing applied to all values of the component of a given row of n image vectors.

According to another characteristic of the invention, during the generation phase of at least one random signature vector, the components of the image vectors undergo centred reduced statistical processing.

According to another characteristic of the invention, during the generation phase of at least one random signature vector:
  the following are applied:
    a number C of statistical classes corresponding to values or levels able to be adopted by random components of the random signature vector,
    and a statistical class corresponding to the unstable nature of the components of one same row of n image vectors,
  to determine the value of each random component of the random signature vector, statistical processing and a statistical stability test are conducted on all the components of one same row of the n image vectors, so that:
    if, after the stability test, it appears that the components of this row of image vectors show a stable nature, then the value or level of the statistical class to which the components of this row of the n image vectors belong is assigned to the random component of the random signature vector,
    if, after this test, it appears that the components of this row of image vectors show an unstable nature, then the value or level of the statistical class to which the component of this row of one of the n image vectors belongs is assigned to the random component of the random signature vector.

According to a further characteristic of the invention, and for the implementation of the above form of the method, during the generation phase of at least one random signature vector, the stability test is performed on the basis of the mean and standard deviation of the components of one same row of image vectors.

According to a further characteristic of the invention, the n acquisition vectors are generated virtually from a real number of acquisitions less than n, even from only one real acquisition.

According to one characteristic of the invention, the random signature vector, generated after the extraction method, comprises at least one random component having a stable nature, the value of this random stable component being able to be found on each implementation of the method on one same region of the subject material element.

According to one characteristic of the invention, the random signature vector, generated after the extraction method, comprises at least one random component having an unstable nature, the value of this unstable random component being likely to vary random fashion on each implementation of the method on one same region of the subject material element.

According to one characteristic of the invention, after the extraction process, all the random components of the random signature vector have a stable nature, the value of each stable random component being able to be found on each implementation of the method on one same region of the subject material element.

According to one characteristic of the invention, after the extraction process, all the random components of the random signature vector have an unstable nature, the value of each unstable random component being likely to vary random fashion on each implementation of the method on one same region of the subject material element.

According to one characteristic of the method for extracting a random signature according to the invention, during the generation phase of at least one random signature vector, the following are generated:
  a stable random signature vector whose random components have a stable nature, the value of each stable random component being able to be found on each implementation of the method on one same region of the subject material element,
  an unstable random signature vector whose random components have an unstable nature, the value of each unstable random component being likely to vary random fashion on each implementation of the method on one same region of the subject material element.

According to a further characteristic of the invention, and after the implementation of the method for extracting a random signature:
  the random signature vector comprises:
    at least one random component having a stable nature so that its value may be found on each implementation of the method on one same region of the subject material element,
    at least one random component which has an unstable nature, so that its value is likely to vary random fashion on each implementation of the method on one same region of the subject material element.
  during the generation phase of at least one random signature vector, a reading mask is generated giving the position in the random signature vector of the stable and/or unstable random components.

The random signature or the random signature vector generated by implementation of the inventive extraction method can be used in different manners, of which the following examples are non-exhaustive.

Hence, according to one characteristic of the invention, the inventive method for extracting a random signature comprises a phase which uses at least part of the stable random signature as identifier of the subject material element or of an object associated with the subject material element in an access control process.

According to another characteristic of the invention, the inventive method for extracting a random signature comprises a phase using at least part of the stable random signature to ensure full confidentiality e.g. as a one-time pad in a symmetric or asymmetric cryptographic process.

According to a further characteristic of the invention, the random signature extraction method of the invention, comprises a phase using at least part of the stable random signature as instruction sequence or as identifier of an instruction sequence in a control process for an logic controller or machine.

According to one characteristic of the invention, the method for extracting a random signature according to the invention comprises a phase using at least part of the stable random signature as variables or parameters of a computer program.

According to another characteristic of the invention, the random signature extraction of the invention comprises a phase using at least part of the stable random signature as one-time pad to encrypt variables and/or executable parts of a computer program.

According to another characteristic of the invention, the inventive method for extracting a random signature comprises a phase using at least part of the unstable random components as identifier of the subject material element or of an object associated with the subject material element, and a phase using at least part of the stable random components to securitize the identifier, in particular by using this part of the stable random component as one-time pad for encrypting the identifier to obtain a securitized identifier.

According to one characteristic of the invention, the inventive method for extracting a random signature comprises:
a phase using at least part of the unstable random components as private key in a public key/private key cryptographic process,
a phase using at least part of the stable random components to securitize the identifier, in particular by using this part of the stable random components as one-time pad for encrypting the private key to obtain a securitized private key.

According to a further characteristic of the invention, the inventive method for extracting a random signature comprises:
a phase using part of the unstable random components as private key in a public key/private key cryptographic process,
a phase using part of the unstable random components as public key in the public key/private key cryptographic process,
a phase using part of the stable random components to securitize the identifier, in particular by using this part of the stable random components as one-time pad for encrypting the private key to obtain a securitized private key.

According to one characteristic of the invention, the inventive method for extracting a random signature comprises:
a phase using at least part of the unstable random components as identifier of the subject material element or of an object associated with the subject material element,
a cipher phase of the identifier using a public key/private key cryptography process to obtain an enciphered or signed identifier,
a phase using at least part of the stable random components to securitize the identifier, in particular by using this part of the stable random components as one-time pad for encrypting the enciphered or signed identifier to obtain an enciphered and securitized identifier.

Under the above variant, part of the unstable random components may be used as private key and, similarly part of the unstable random components may be used as public key.

Other examples of the use of a random signature or of a random signature vector produced using the extraction method of the invention may be found in applications FR 2866139, WO 200578651, WO 2005122100, US 2005262350, FR 2870376.

According to the invention, the decomposition base used for the random signature extraction method may be a pre-existing base or a base generated by the random signature extraction method of the invention.

Therefore, the invention also concerns a method for generating a decomposition base which can be used to extract a random signature from a subject material element, comprising the following steps:
generating N acquisition vectors of structural characteristics of at least one region of at least one material element separate from the subject material element and/or the subject material element itself,
analysing all the acquisition vectors using statistical methods to obtain the decomposition base formed of decomposition vectors enabling a representation of each acquisition vector in the form of an image vector, of which each component corresponds to the contribution of a decomposition vector in the acquisition vector,
analysing at least part of the decomposition vectors to identify that or those decomposition vectors, called common or certain contribution decomposition vectors, which will form the origin of highly determinist and/or common components to all the image vectors obtained when using the decomposition base,
saving the decomposition base,
optionally saving a reading mask which, in the decomposition base, gives the position of the possible decomposition vectors at the origin of determinist components and/or the position of the decomposition vectors at the origin of random components.

According to one characteristic of the invention, the analysis of the decomposition vectors comprises the following steps:
projecting each acquisition vector onto the decomposition base to obtain an image vector of which each component corresponds to the contribution of a decomposition vector in the acquisition vector,
analysing at least part of the image vectors to identify that or those components which are highly determinist and/or common to all the image vectors, the determinist components corresponding to decomposition vectors in the decomposition base that are called common or certain contribution decomposition vectors, the other components of an image vector being considered as random components.

According to one characteristic of the invention, it is considered that a component is of highly determinist nature if its value is predictable in relation to the type of the material element.

According to another characteristic of the invention, each acquisition vector is preferably at least of two-dimensional nature.

According to another characteristic of the method for generating a decomposition base of the invention, the generating method comprises a removal step to remove common or certain contribution decomposition vectors from the decomposition base, and a step to save the reduced decomposition base called a decomposition base into random components.

According to a further characteristic of the inventive method for generating a decomposition base, the generating step to generate acquisition vectors is performed with at least one material element of the same family as the subject material element used in the random signature extraction method.

According to another characteristic of the inventive method for generating a decomposition base, the step to generate acquisition vectors comprises the following steps:

generating a number N of acquisitions, according to an acquisition window, of structural characteristics of at least one region of at least one material element separate from the subject material element and/or of the subject material element itself, digitizing, along a scanning path, each of the acquisitions into the form of an acquisition vector.

As for the random signature extraction method, the method for generating a decomposition base may comprise a step to define the characteristics of the acquisition window. Therefore, according to one variant of the invention, the method for generating a decomposition base comprises a reading step to read the characteristics of the acquisition window. Similarly, the method for generating the decomposition base may also comprise a step to save the geometric characteristics of the acquisition window.

Similarly, the method for generating a decomposition base may also comprise a step to define the characteristics of the scanning path. The method for generating a decomposition base may then comprise a reading step to read the characteristics of the scanning path, and a step to save the characteristics of the scanning path used for the digitization step.

According to one characteristic of the invention, the method for generating a decomposition base, in order to obtain the decomposition base, uses a Principal Component Analysis algorithm.

According to another characteristic of the invention, the method for generating a decomposition base, in order to obtain the decomposition base, uses an Independent Component Analysis algorithm.

According to yet another characteristic of the invention, the method for generating a decomposition base, in order to identify determinist components, uses a spectral decomposition algorithm and identification of certain contribution decomposition vectors by filtering.

According to one characteristic of the method for generating a decomposition base, also applicable to the method for extracting a random signature from a subject element material, each material element used is chosen from among: materials of dead biological origin, materials of organic origin, materials of mineral origin or materials obtained by mixture and/or composition and/or deposit of several of the preceding materials.

Evidently, the different characteristics of the random signature extraction method may be combined with each other in different manners insofar as they are not incompatible with each other.

Similarly, the different characteristics of the method for generating a decomposition base may be combined with one another in different manners insofar as they are not incompatible with each other.

The present invention also concerns an apparatus or device comprising acquisition means, processing means and memory means, the processing and memory means at least being adapted to implement the random signature extraction method and/or the method for generating a decomposition base according to the invention. According to the invention the device may further comprise communication means.

The present invention also concerns a computer program being adapted to implement the random signature extraction method and/or the method for generating a decomposition base according to the invention.

Various other characteristics of the invention will become apparent from the description given below, referring to the appended drawings which illustrate non-limiting examples for implementing the methods that are the subject of this invention.

Figure 13A:
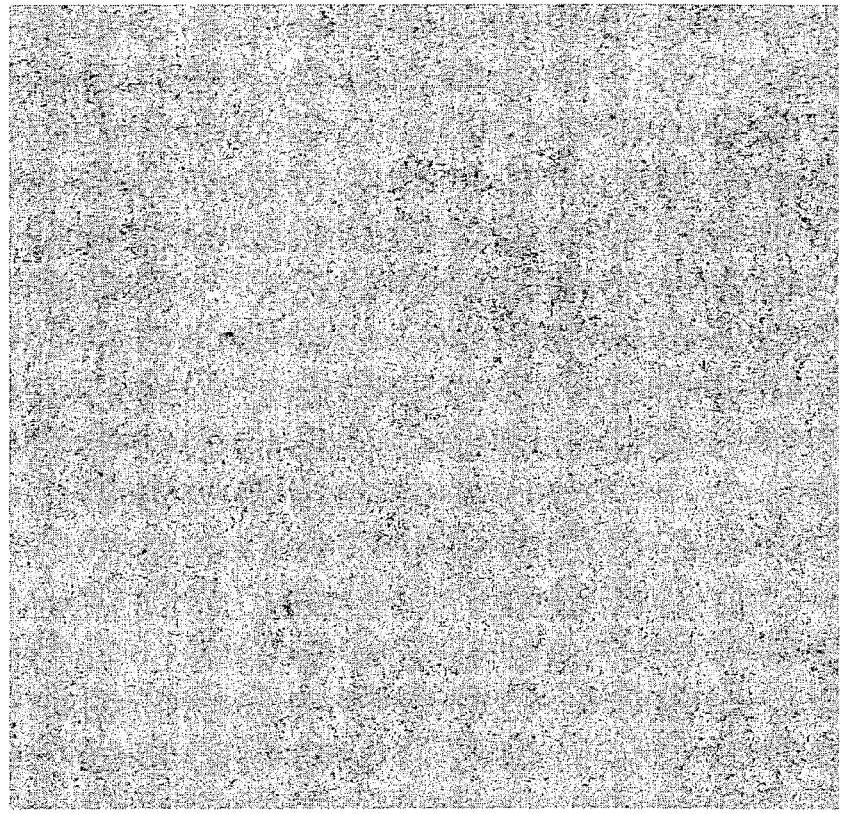
Figure 13B:
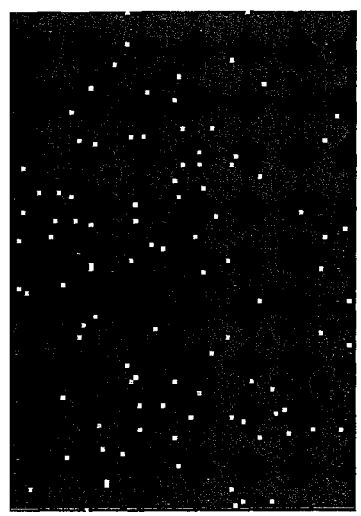

FIG. 13 gives a digital image (13A) in transvision of part of a sheet of paper, and a view (13B) giving the result of statistical processing applied to the random signature extracted from the sheet of paper using the inventive method.

FIGS. 14 to 17 illustrate examples of use of part of the stable random components that are constituent parts of a random signature extracted using the inventive method.

FIGS. 18 to 21 illustrate examples of use of part of the stable and unstable random components that are constituent parts of a random signature extracted using the method of the invention.

As mentioned previously, the invention concerns a method for extracting a near-pure, partly or fully stable, random digital signature from a subject material element 1 having a time-stable microstructure, partly chaotic, revealed by physical, chemical, biological or other stimulating action.

The invention also concerns the use of this signature to produce random sequences for example, or private keys, pairs of public/private keys, self-protected identifiers of subject element 1.

According to the invention, the constituent material of subject material element 1 may, for example, be of dead biological origin, organic, or mineral origin or result from the mixture, composition or deposit of materials of dead biological, organic or mineral origin. The constituent material of subject material element 1 is chosen for the time-stable chaotic nature of its microstructure which is intended to be revealed by physical, chemical, biological or other stimulation.

Some materials, such as paper, intrinsically contain a structure that is at least partly chaotic arising from the variability of their components, the variability in their arrangement and/or complexity of manufacturing process. According to the illustrated embodiment of the invention, subject material 1 is a sheet of paper.

The invention sets out to extract or acquire at least part of the structural characteristics of subject material element 1 which give information on the complexity or chaotic structure of its structure. For this purpose one or more, preferably non-destructive, stimulations, chosen according to the type of subject material element 1 are applied to at least part of subject material 1. The stimulation may derive from mechanical action, a light ray source or another other physical source. The response to this stimulation by subject material element 1 is then recorded by means of an appropriate sensor chosen according to the type of stimulation made and the type of subject material element 1.

For a translucent material such as paper, physical stimulation may be applied by a light source which emits a light ray whether coherent or not, polarized or not, illuminating a piece of paper in transmission or reflection, the image corresponding to the response of the material to light stimulation then possibly being acquired using a digital camera.

Hence, according to the illustrated example, subject material element 1, consisting of paper, is illuminated by means of a lamp 2 emitting incoherent white light. The image resulting from transmission of white light by part 3 of subject material element 1 is acquired using a matrix sensor 4 integrated in a camera 5 linked to a processing unit 5$_1$.

The form of that part 3 of subject material element 1 whose image is acquired by sensor 4, is defined by the form of an acquisition window whose limits or boundaries are fixed either by the form of the sensor, or by the form of a diaphragm whether adjustable or not, or by processing applied to the signal derived from sensor 4 so that solely part of the data is kept. For example, if the surface of sensor 4 is of rectangular shape such as illustrated FIG. 2 the limits of the acquisition window, in the absence of processing and diaphragm, correspond to the physical limits of the sensor surface. However, according to the invention, it may be chosen to define an acquisition window whose limits or form do not correspond to those of the sensor 4. For example, an acquisition window 6 may be chosen which only corresponds to part of the sensor and is of irregular shape such as illustrated by the dotted lines in FIG. 2. This acquisition window 6 may then result either from the positioning of a physical diaphragm inserted between the subject material element 1 and the sensor 4, or from processing applied to the signal from the sensor 4.

Figure 2:
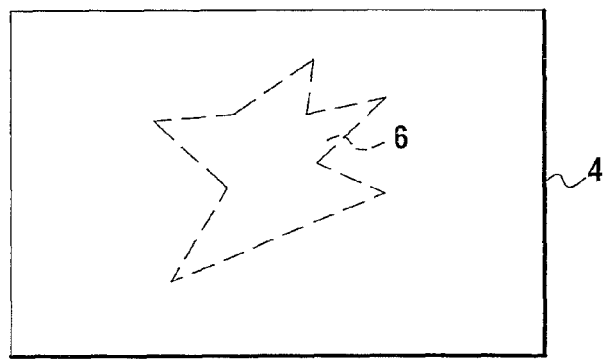
FIG. 2 is a schematic view of the acquisition surface of a matrix sensor and of an acquisition window used for the inventive methods.

Evidently, the form of the acquisition window 6 illustrated FIG. 2 is not limitative and any other shape could be adopted. Hence, acquisition window 6 is not necessarily unitary or in one piece but may correspond to separate regions distant from each other. Similarly the shape of the acquisition window is not necessarily planar or two-dimensional but may also, in relation to the sensor and/or stimulation, correspond to a volume or to a mathematical object with more than three dimensions. The shape of the acquisition window in its broad meaning, namely the appearance of its limits or boundaries, its position, its orientation, form an input data item or a parameter for implementation of the invention both regarding the method for generating a decomposition base and the method for extracting a random signature.

Under the principle of a preferred embodiment, the random signature extraction method of the invention sets out to decompose the image signal of the predefined region 3 of subject material element 1 into a sum of elementary mode contributions, each contribution consisting of a mode to which a scalar or component weight is assigned. In the image signal some of these modes may translate the presence of certain evolutionary physical phenomena described by Partial Derivative Equations such as diffusion or propagation. Said modes may in particular form the own particular modes of a space operator (e.g. Laplacian) and depend on the boundary of the predefined investigation regions, namely the form of the acquisition window in its broadest meaning.

All the modes which can be used for description of the image signal, i.e. its decomposition, called decomposition base, may or may not be overcomplete. The decomposition base may be fixed or adapted to the image signal. Adapted bases may derive from an: analysis of projection pursuits, in particular a component analysis which may or may not be based on decomposition of singular value decomposition type such as Principal Component Analysis (PCA) or PCA-related such as Independent Component Analysis (ICA) or any other analysis close to PCA or ICA (e.g. ACP scattered PCA).

The random signature extraction method of the invention therefore uses a base B, optionally overcomplete, which may or may not be generated in full or in part from a first material element whether or not of the same family of elements as the subject material element, or from the subject material element itself.

Insofar as the use of a decomposition base particularly adapted to the random signature extraction method of the invention is able to achieve better extraction of the desired random signature, the invention also concerns a method for generating a decomposition base B which can be used to extract a random signature from a subject material element.

Figure 3:
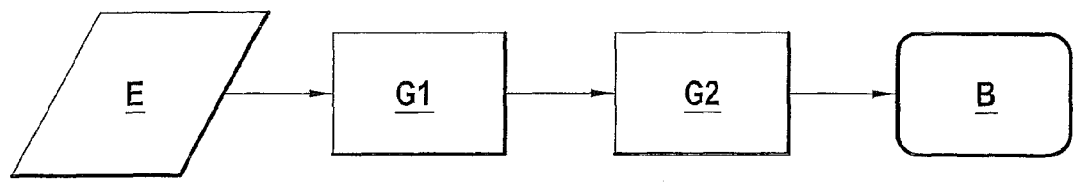
FIG. 3 is a summary diagram of the conducting of a decomposition base generating method according to the invention.

FIG. 3 shows the steps for generating the decomposition base B from a material element E.

Figure 1:
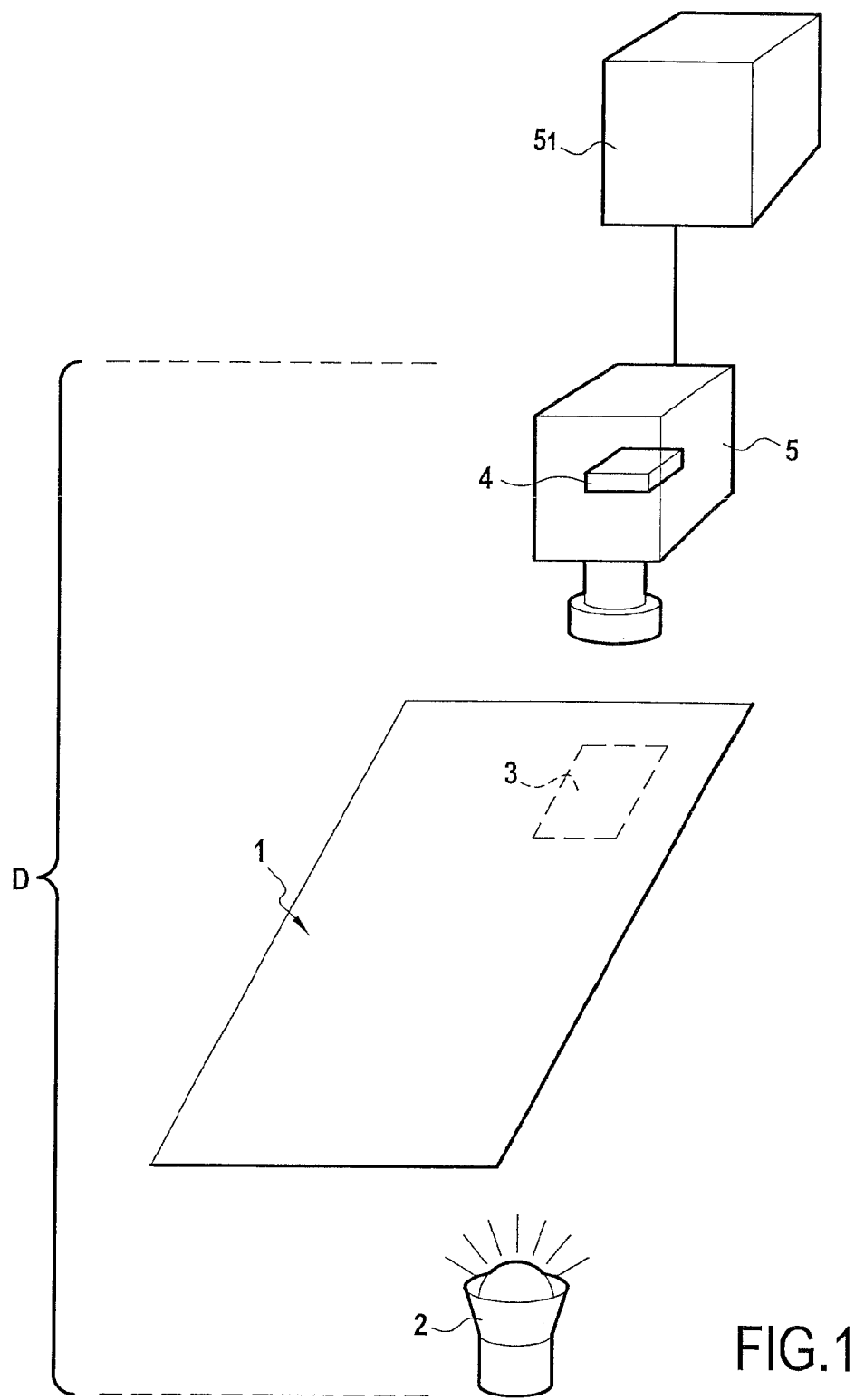
FIG. 1 is a schematic view of an installation or device for implementing the methods for generating a decomposition base and for extracting a random signature from a material element.

During a first step G1, N different regions of the material element E are the subject of an acquisition (static or relative movement) and are then digitized using a device D such as illustrated FIG. 1. During this first step G1 N acquisition vectors are therefore generated of structural characteristics of N regions 3 of subject material element 1, wherein N is 2 or more and preferably much higher than 2.

If a matrix sensor 4 is used comprising a number M of cells, on each acquisition the camera delivers an acquisition vector comprising M components; when the acquisition window 6 has a smaller surface than the sensor 4, as illustrated FIG. 2, the generation phase G1 comprises a step to reduce the acquisition vector derived from the camera 5 so that it only comprises the m components concerning acquisition window 6, wherein M≥m. Also, the arrangement of the components in each acquisition vector depends on the direction of scanning or on the scanning path, for example horizontal scanning starting with the upper left cell as illustrated FIG. 4 or vertical scanning starting with the lower left cell as illustrated FIG. 5, or any other form of scanning path such as a Peano curve. According to the invention, the configuration of the scanning path may form a parameter for implementation of the method for generating the decomposition base. Insofar as a random signature is extracted that is at least partly stable or reproducible, the same scanning path is preferably used for the decomposition base generating method and on each implementation of the extracting method.

The characteristics or configurations of the acquisition window and the characteristics of the scanning path define what may be called the acquisition structure forming parameters for implementation of the decomposition base generating method.

Intended to acquire the organisation of the stimulated microstructure, the N acquisition vectors so formed are preferably at least of two-dimensional type, and are considered to represent a family of material elements.

During the following step G2 an analysis is made of all N acquisition vectors using a method for obtaining characteristic elementary modes describing the data. Each acquisition vector may then be represented by these modes, each mode making a more or less important contribution. The modes are vectors enabling the decomposition of each acquisition vector into the form of a contribution sum, each contribution consisting of a decomposition vector to which a scalar or component weight is assigned. All the components form an image vector describing the acquisition vector under consideration. Therefore, the acquisition vectors form the columns of a data matrix which can be expressed as the product of the matrix of decomposition column-vectors, also called base vectors or decomposition vectors, by the matrix of the image column-vectors.

Generally, analysis methods which build bases adapted to data are candidate methods able to be used by the invention. Principal Component Analysis (PCA) and its variants form part thereof. Centred-reduced PCA, by decomposing the matrix of centred reduced acquisition vectors into singular values, delivers the orthogonal matrix of the base vectors or decomposition vectors. The image vectors are deduced therefrom by simple projection of the acquisition vectors onto this base. The components of the image vector then have the property of being centred and de-correlated.

Independent Component Analysis (ICA) which provides the same type of analysis as PCA (in that the components of the image vector obtained have the property of being centred, de-correlated and even near-independent), may also be used. The decomposition vectors and the image vectors are obtained simultaneously, e.g. by maximizing the non-Gaussianity of the components of the image vector. Different algorithms meet this criterion depending upon implantation (FastICA, JADE, InfoMax, ... ).

All the decomposition vectors then form a decomposition base B which can be used for the inventive method of extracting a random signature from a subject material element. For this purpose, the decomposition base B may be stored or saved so that it can be used on request when implementing the random signature extraction method of the invention, on the understanding that this method may also provide for the generation of a decomposition base B as explained previously on each extraction of a random signature.

When generating the decomposition base, it may also be considered to proceed with analysing at least part of the image vectors to identify that or those components which are highly determinist and/or common to the majority of and even all the image vectors, the determinist components corresponding to decomposition vectors in the decomposition base, called common or certain contribution decomposition vectors, the other components of an image vector being considered as random components. At the end of this analysis either a reading mask is saved which, in each image vector, gives the position of any determinists and/or the position of any random components, or a reduced decomposition base is saved whose determinist decomposition vectors have been deleted.

Figure 4:
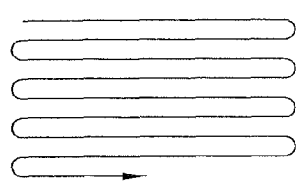
FIGS. 4 to 5 show examples of the scanning path which can be used for the generating and extracting methods of the invention.
Figure 6A:
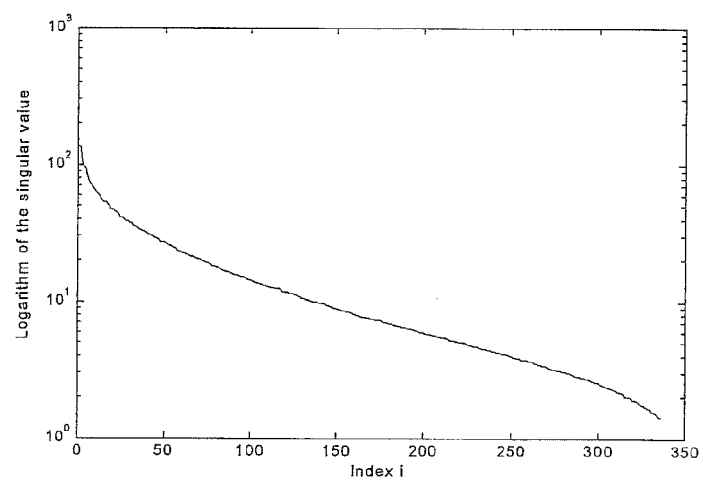
FIGS. 6 to 8 show examples of parts of decomposition bases generated using the inventive method.
Figure 6B:
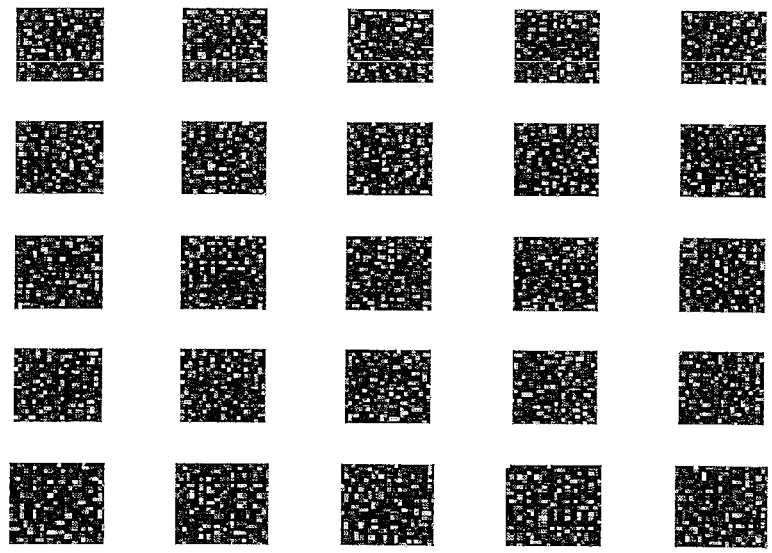
Figure 6C:
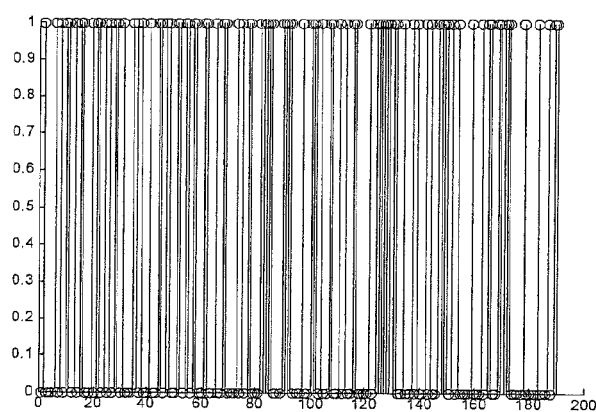

FIG. 6 illustrates an example of decomposition base generation made using images of a piece of paper illuminated by transmission in incoherent light with a square-shaped acquisition window, and a scanning path of horizontal scanning type such as illustrated FIG. 4. Generation of the base has also been made using Principal Component Analysis (PCA). Part 6A in FIG. 6 is a graph showing the PCA spectrum (all own values) while part 6B shows 25 base elements belonging to the second third of the spectrum.

Figure 5:
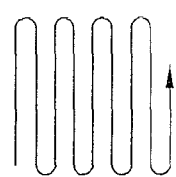
Figure 7A:
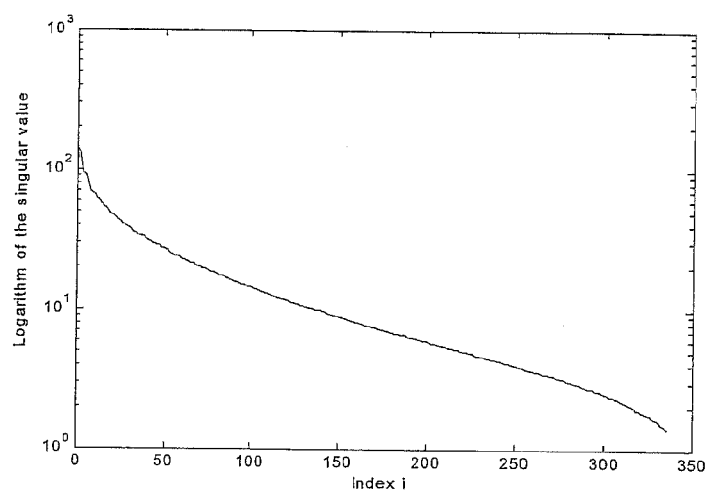
Figure 7B:
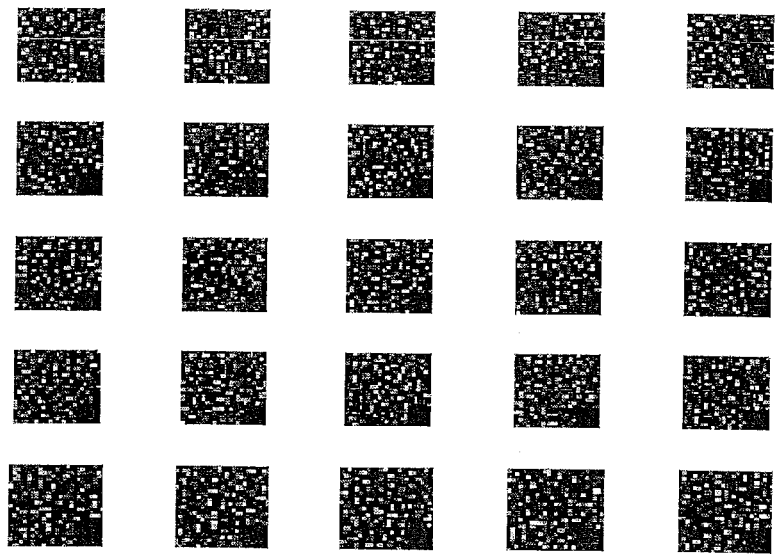
Figure 7C:
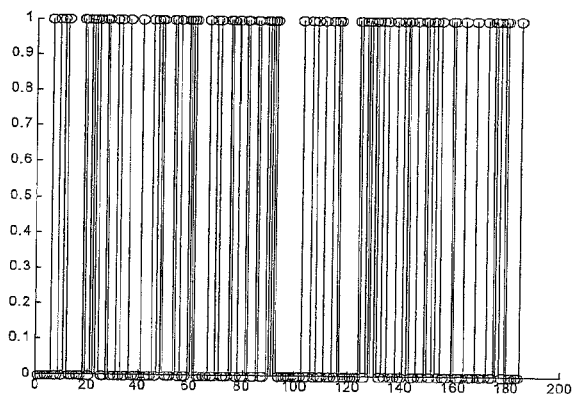

Similarly, FIG. 7 illustrates an example of decomposition base generation, made using images of a piece of paper illuminated by transmission in incoherent light, with a square-shaped acquisition window and a scanning path of vertical scanning type such as illustrated FIG. 5. Generation of the base has also been made by Principal Component Analysis (PCA). Part 7A in FIG. 7 is a graph showing the PCA spectrum, whilst part 7B shows 25 base elements belonging to the second third of the spectrum.

Figure 9:
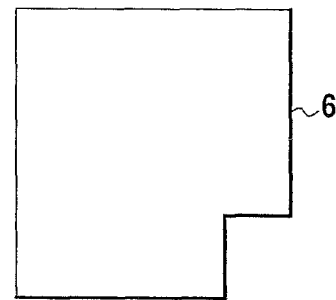
FIG. 9 illustrates the form of the acquisition window used to generate the base such as illustrated FIG. 8.
Figure 8A:
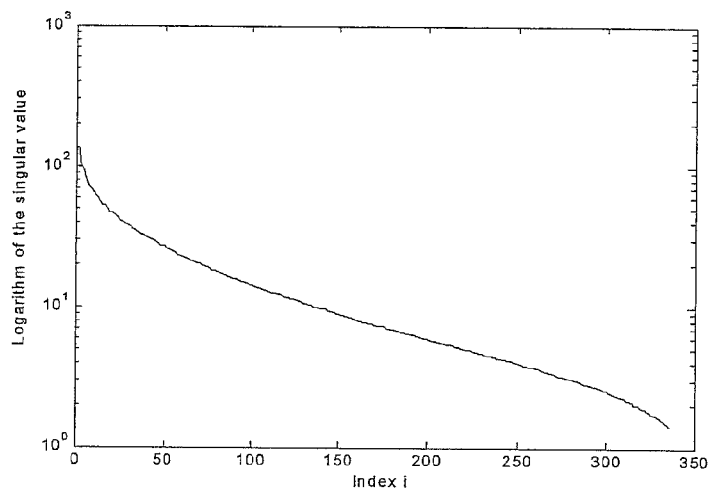
Figure 8B:
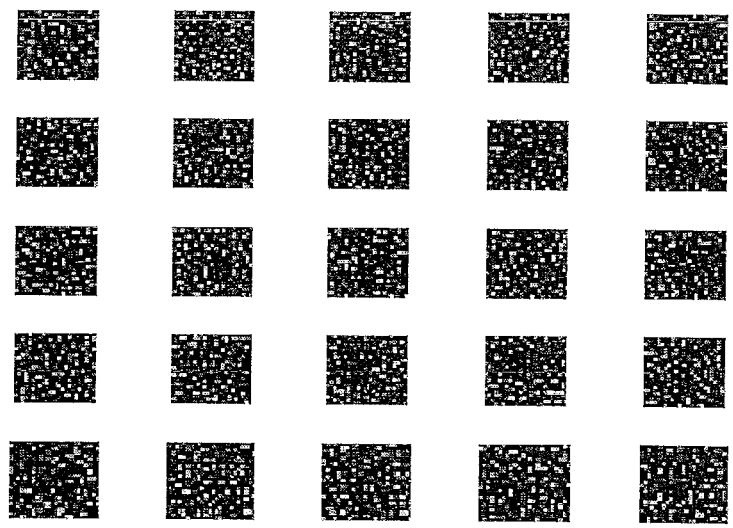
Figure 8C:
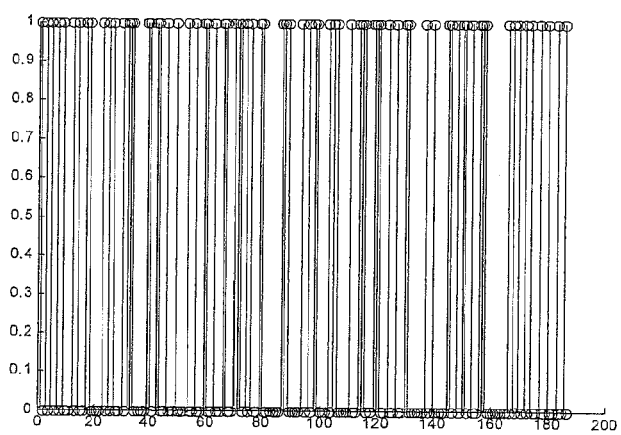

FIG. 8 illustrates another example of the generation of a base made using images of a piece of paper illuminated by transmission in incoherent light with a non-square shaped acquisition window, illustrated FIG. 9 and a scanning path of horizontal scanning type such as illustrated FIG. 4. Generation of the base has also been made using Principal Component Analysis (PCA). Part 8A in FIG. 8 is a graph showing the PCA spectrum, whilst part 8B shows 25 base elements belonging to the second third of the spectrum.

Figure 10:
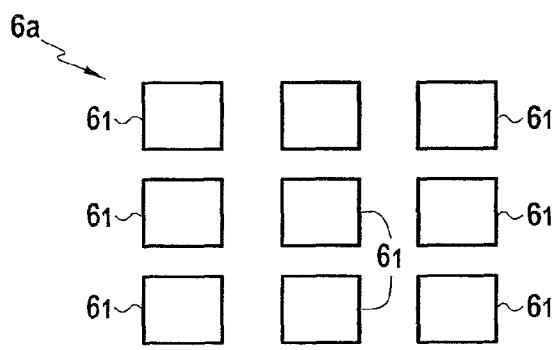
FIG. 10 illustrates another form of the acquisition window which may be used in a variant of the methods for generating a decomposition base and extracting a random signature according to the invention.

According to one variant of implementation of the decomposition base generating method, the acquisition window 6a used consists of a number i of elementary windows $6_1$ identical and not joined together as shown FIG. 10. According to the illustrated example, window 6a comprises 12 elementary windows $6_1$ of rectangular shape (i=12). Generation of the decomposition base then uses a phase to generate an elementary decomposition base whose elementary decomposition vectors are generated using the previously described method applied to elementary windows $6_1$ taken individually, an acquisition of window 6a then being treated as i acquisitions of an acquisition window that is identical to an elementary window $6_1$. During the generation phase of the elementary decomposition base, the elementary windows $6_1$ and their acquisitions are therefore considered to be independent from one another, so that the generated elementary decomposition base allows the decomposition of each elementary acquisition corresponding to an elementary acquisition window $6_1$ into an elementary image vector with random components whose components correspond to the respective contributions of the elementary decomposition vectors. To obtain a decomposition base which can be used for acquisition window 6a taken as a whole, the generation of the decomposition base then uses a step to create the decomposition base from the elementary decomposition base by forming each decomposition vector by concatenation of i times one same elementary decomposition vector. Therefore, the decomposition base comprises the same number of vectors as the elementary decomposition base, and if each elementary decomposition vector comprises j components then each decomposition vector will comprise i×j components A decomposition base generated according to either one of the above variants of the inventive generating method can then be used with a random signature extraction method according to the invention.

Figure 11:
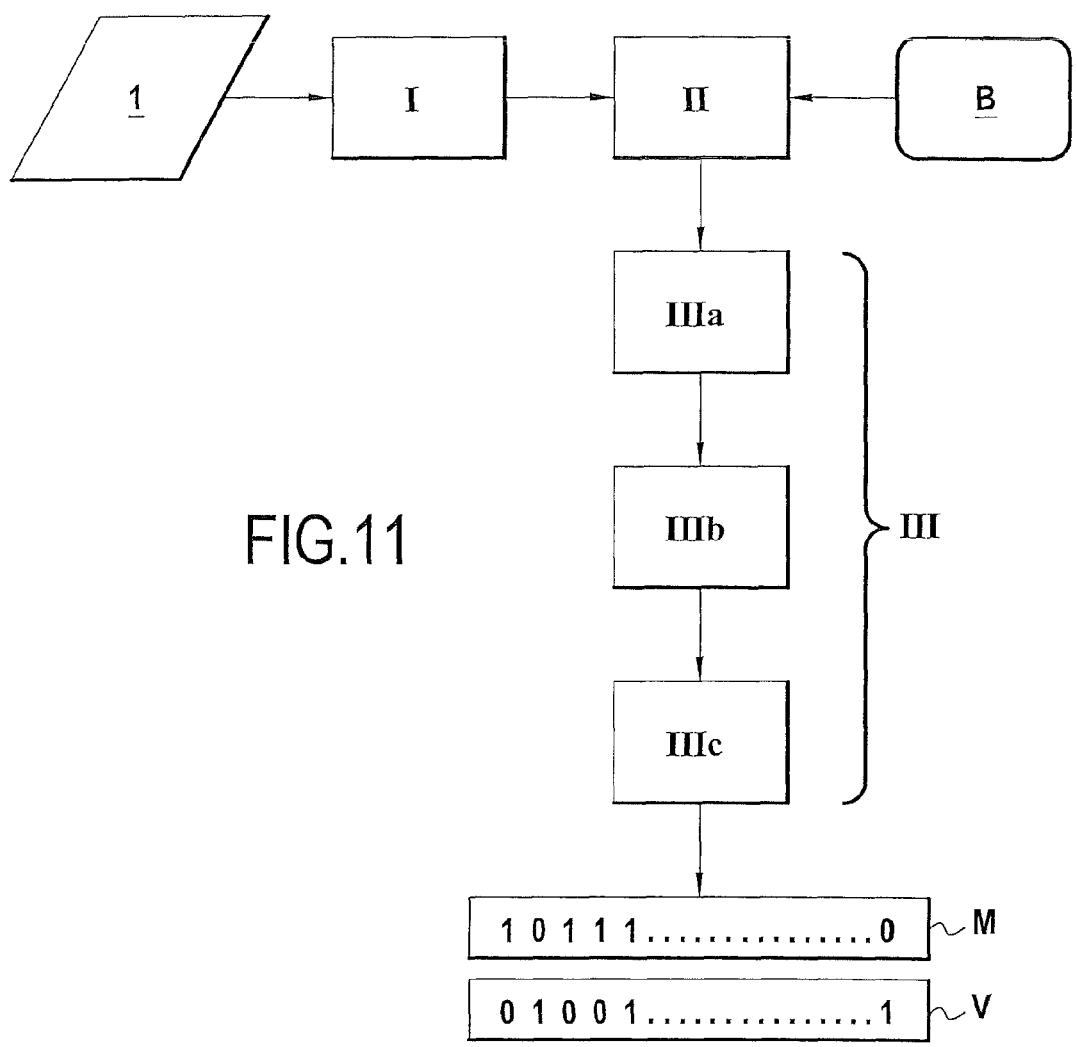
FIG. 11 is a summary diagram of the conducting of a method for extracting a random signature according to the invention.

In a preferred embodiment, the method for extracting a random signature from a subject material element 1, as arises from FIG. 11, comprises the following phases.

First, if the decomposition base B is not generated when extracting the random signature, a pre-recorded decomposition base B is chosen which will be used for extraction. Optionally the decomposition base B is associated with characteristics of an acquisition window 6 and of a scanning path which may be used for extracting the random signature.

Then a generation phase i is conducted to generate at least one and preferably n acquisition vectors of structural characteristics of region 3 of subject material element 1, wherein n is 2 or more and preferably much higher than 2. The generation of the acquisition vectors may be made using an acquisition window 6 or 6a such as defined previously. When it is desired to extract a stable or reproducible random signature from an object material element 1, the same acquisition window or the same window acquisition parameters are used for each implementation of the inventive method, these parameters preferably being those of the acquisition window optionally associated with decomposition base B.

When using a matrix sensor 4 comprising an M number of cells, the camera delivers an acquisition vector comprising M components; if the acquisition window 6 has a smaller surface than the sensor 4, as illustrated FIG. 2, the generation phase I comprises a step to reduce the acquisition vector derived from camera 5 so that it only contains the m components concerning acquisition window 6, wherein M≥m.

Also, the arrangement of the components in each acquisition vector depends on the direction of scanning or on the scanning path, e.g. horizontal scanning staffing with the upper left cell as illustrated FIG. 4 or vertical scanning starting with the lower left cell as illustrated FIG. 5, or any other form of scanning path. According to the invention, the configuration of the scanning path may form a parameter for implementation of the extraction method. Insofar as a random signature that is at least partly stable or reproducible is extracted, the same scanning path will be used for each implementation of the method, and if the decomposition base is associated with a scanning path, it is this latter path which is preferably used.

The characteristics or configurations of the acquisition window and the characteristics of the scanning path define what may be called the acquisition structure.

Phase I therefore entails the generation of n acquisition vectors. These n acquisition vectors then correspond either to n separate real acquisitions, or to one real acquisition from which n acquisition vectors are generated. If the acquisition window 6 has a smaller surface than the sensor 4 it is possible to generate an acquisition vector corresponding to the real acquisition and n−1 acquisition vectors generated by simulating micro-displacements of the acquisition window 6 relative to the sensor 4, these micro-displacements corresponding to positioning errors of subject material element 1 during its successive placing n−1 times in the digitization device D which, according to the illustrated example, comprises the light source 2 and camera 5.

This set of acquisition vectors may, by averaging, be used to reduce the acquisition noise with real acquisition vectors resulting from the noise of the camera 5 and the radiation source 2 and, in the case of calculated or synthesized acquisition vectors, the noise which may be caused by repositioning of subject material element 1.

After phase I there are n column acquisition vectors each comprising m components which therefore form a matrix with m rows and n columns.

A phase II is then conducted to decompose each acquisition vector, according to a decomposition base B containing decomposition vectors, into random components to obtain n image vectors which each comprise a number m' of components wherein m≥m'.

The decomposition base used may for example be a pre-existing base optionally created from material elements of same type as the subject material element, or a base created from the subject material element by analysing several regions of the latter as described previously.

On completion of phase II we therefore have an image matrix comprising m' rows and n columns. This image matrix is used for following phase III to generate at least one random signature vector, phase III according to the illustrated example comprising three steps IIIa, IIIb, IIIc.

The first step Ma of phase III, is a step to reduce the image matrix by removing overactive image vectors from the components—called invalid image vectors—and which therefore do not conform to the search for a purely random component for the signature vector. The activity of a component of a given row may be measured by analysing one row in the image matrix. Measurement may be statistical after estimating the histogram of the previous row. It may also be defined as the energy of a row. The decision to remove an invalid component can be taken with respect to the other components after evaluating the activity of each of the components. A reduced image matrix is then obtained, comprising n reduced image vectors which each have m" components wherein m'≥m".

Figure 12:
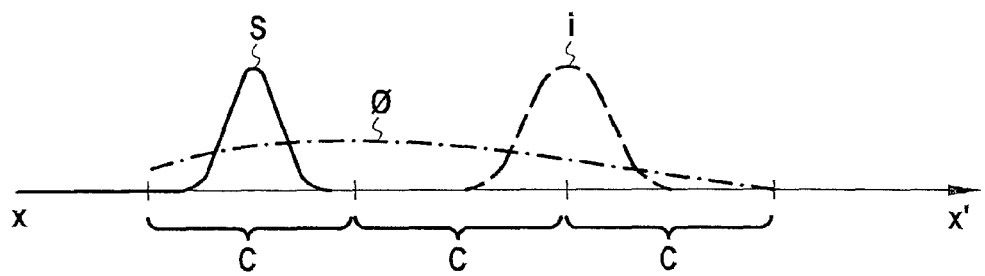
FIG. 12 illustrates a classification and quantification step used in the random signature extraction method described with reference to FIG. 11.

Step IIIb classifies the components of the image vectors of the reduced image matrix, leading to the qualification of their stable or unstable nature. For this purpose and as schematically illustrated FIG. 12, the axis of values x=x'associated with each of these components is divided into different predefined statistical classes c which will be used for quantification into (discrete) levels during subsequent step IIIc. If a given component, corresponding to one row of the matrix, is considered to belong to one of these classes—called quantification classes—it is then declared stable. The inclusion in said class may be determined after statistical analysis of the row corresponding to the component. This analysis may proceed with estimating the histogram of the row followed by an estimation of its mean values and standard deviation. The inclusion in the class under consideration can be considered true when the histogram s is almost completely contained in the class under consideration (e.g. the mean centred interval, of equal width to a certain number of times the standard deviation, is fully contained in the class). If the histogram i is « equi-distributed» between two classes, the component is considered unstable and allocated to another class called the unstable class. Finally, if the histogram Ø is distributed over several classes or over two classes dissymmetric fashion, the component is generally considered to be unfit and is allocated to a so-called unfit class.

Following step IIIc carries out quantification (or assignment of discrete levels among a finite group of numbers) of stable or unstable (valid) components. During this step, the unfit components (i.e. belonging to the unfit class) are not processed (considered as absent terms or « holes» in the image matrix) and do not give rise to any component in the signature vector which will then contain m'" components, wherein m"≥m'".

The stable components are given the level of quantification corresponding to their class (stable). For example, when the acquisition vectors are centred reduced, a quantification on two levels or binarisation can be conducted by assigning level 1 to a positive component and level 0 to a negative component.

The unstable components have a value which may be any value, in which case the corresponding component of the signature vector will be given the value of the class corresponding to the value of the component for a predefined image vector. For example, when the acquisition vectors are centred reduced and quantification on two levels or binarisation is made, an unstable component is assigned a binary level, 0 (for example) if the value of the component in a predefined image vector (for example the first) is negative, 1 if it is positive.

A reading mask identifying or separating the stable components from the unstable components in the signature vector can then be generated during step IIIc.

Therefore, according to the illustrated example, on completion of phase III generating a random signature vector, a reading mask M is obtained and a random signature vector V. In the present case, the reading mask M is a vector comprising the same m'" number of components as the random signature vector V. A component of the reading mask has a value 0 for example when the corresponding component of the random signature vector V is unstable, and a value 1 when the corresponding component of the random signature vector V is stable.

Each component of the random signature vector V derives from a random component of an image vector considered to be valid after step IIIa, and stable or unstable after step IIIb.

Parts C in FIGS. 6 to 8 each show an extract of a binary sequence belonging to a random signature obtained with the extraction method of the invention using the decomposition base decomposing into random components, of which part of the elements or vectors is shown in part B of the corresponding figure.

By way of example, the random signature extraction method was applied to a piece of paper illuminated by transmission in incoherent light using a decomposition base generated from another piece of paper. Statistical tests were performed on the components of the random signature vector V, comprising a sequence of 66 048 bits extracted from images of paper with a resolution of 3200 dpi, in order to determine the quality of the signature extracted using the inventive method. Results were as follows:

Entropy=1.000000
Optimum compression ratio=0
$Chi^2$ distribution=0.79
Mean arithmetic value=0.5001.
Error on Monte-Carlo value for Pi=0.05
Series correlation coefficient=−0.000385

Since the inventive method generates a signature which is an image of the material structure of the subject material element, these results associated here with knowledge of the chaotic nature of the paper translate the purity or random nature of the random signature vector V generated by the inventive method.

Similarly, the very strong random nature of the random signature vector V is shown indirectly in FIG. 13, with the random search for prime numbers in a random signature of 9 200 000 bits extracted using the method of the invention from a piece of paper of A4 format, and by performing a succession of 20 primality probabilist tests called Miller-Rabin tests.

Part 13A in FIG. 13 corresponds to an image of a square area, with sides of 2 cm, of a standard sheet of paper illuminated by transmission with incoherent light. Part 13B in FIG. 13 corresponds to the representation by white dots of the first 100 prime numbers extracted from a random signature among the 125×(86−1) prime numbers of 18 bits represented in the form of a black image of 125×86 pixels. Observation of part 13Bb in FIG. 13 shows the uniformity of the distribution of numbers found in all prime numbers, here of 18 bits, a uniformity which results from the random nature of the signature extracted using the method of the invention.

Also, it is to be noted that when implementing the inventive extraction method, the value of the stable part of the extracted random signature may be influenced by the following factors:

the subject material element and in particular the region of the subject material element from which the random signature is extracted,
the form of the acquisition window, and in particular its position and orientation,
the form of the scanning path,
and the decomposition base used, in particular the material element (or material elements) which may have been used to generate the decomposition base, if different from the subject material element.

The factors may therefore form as many parameters for implementing the random signature extraction method of the invention.

Therefore, although conventionally treated as noise, that part of the image signal corresponding to the chaotic content of the subject material element is, according to the invention, used in such manner as to extract a random signature i.e. a priori unpredictable. The components of the random signature vector V are therefore unpredictable both as a whole but also one from another. It is also to be pointed out that the random signature of the invention finds its origin in the structure of the material of the subject material element and not in the algorithms or processing operations used, which means that the invention extracts the signature with a minimum number of processing operations so as to preserve the intrinsic structural characteristics of the subject material element. In addition, the signature of the invention has a digital nature i.e. it consists of components with values quantified in finite number or «levels». All the components of the signature therefore form a near-pure random sequence of levels which may be used as such, or to generate a random germ in any areas where it is necessary such as for identification, certification, traceability, cryptography, in particular for authentication, the generation of private keys and/or public keys, the securitization of data, secret-sharing, for steganography but also for computing, or in robotics for simulating or commanding random events (computer games, programming, . . . ).

As described previously, the method subject of the invention qualifies each component of the random signature as stable or unstable. A signature component is declared stable when its level can re-occur with strict or near-strict identicality and very high probability after any new stimulation of the material element, under identical or similar conditions. An error detector/corrector code can then be used to increase the stability of the components, in particular for data securitization or accessing.

A random signature extracted using the method of the invention can be used in different manners.

Through the stable components which may be extracted therefrom, the material element may be used as a possessor's physical key. The stable random components may also be used to produce a One Time Pad or to generate an identifier particular to the material element.

Figure 14:
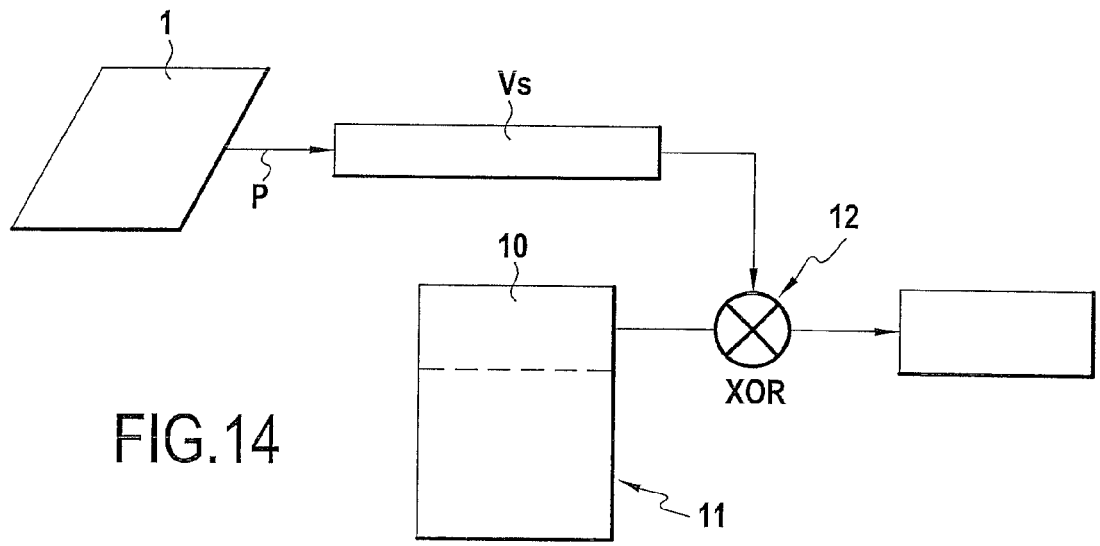

FIG. 14 illustrates one use of the stable components Vs of a random signature generated from a subject material element 1 using the extraction method P of the invention to ensure the protection of essential variables or parameters 10 of a computer program 11. For such use, the stable random signature Vs is used as one-time key in an encrypting process 12, e.g. of XOR type, to obtain securitized essential variables 13. It is therefore possible to protect these essential variables with the stable random derived from material element 1 and to subject the proper execution of the program to the presence of the authentic material element in an acquisition system, not shown, linked to a computer, also not shown, which runs the computer program 11 using the essential variables. The subject material element 1 is then needed to decrypt the securitized essential variables 13 and to revert to the essential variables 10 used by the computer program 11.

Figure 15:
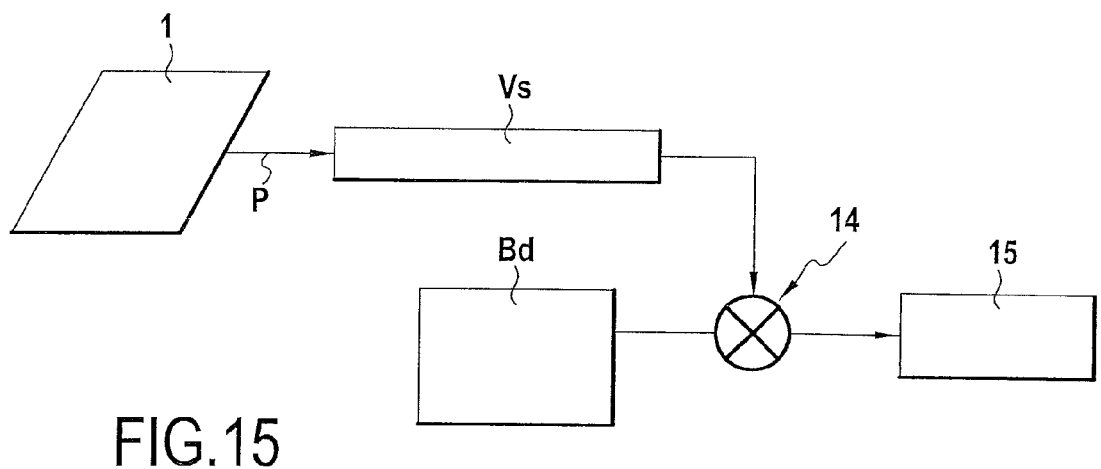

FIG. 15 shows one use of the stable components Vs of a random signature generated from a subject material element 1 using extraction method P of the invention to control access to premises, machines, activities or even information. According to this example of use, the stable random signature Vs is used as identifier and is compared by means of a statistical comparison process 14 with the content of a database B$d$ of authentic identifiers to authorize access 15 if the result of comparison is positive.

Figure 16:
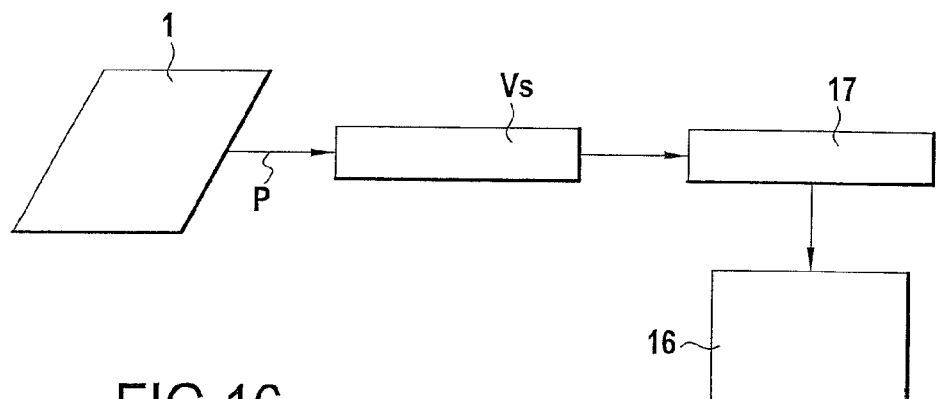

FIG. 16 illustrates a further use of the stable components Vs of a random signature generated from a subject material element 1 using the extraction method P of the invention to command a programmable logic controller 16. According to this example of use, the logic controller 16 acts in relation to random instructions 17 derived from the stable random signature Vs. The actions performed by the logic controller 16 may be of various kinds such as those corresponding to machining, weaving, displacement, opening or closure, dosing of elements or the piloting of other logic controllers or machines, without this list being considered as exhaustive.

It could also be considered to associate the stable random signature Vs with predefined actions via a correspondence data base relating values of stable random components to one or more sequences of instructions.

Along the same principle, it could be considered to control the functioning of a computer program using a stable random signature Vs. In this case, either one part of the components of the stable random signature corresponds directly to parameters of the computer program, or a correspondence base is used between the stable random components and predefined parameters for the computer program.

Figure 17:
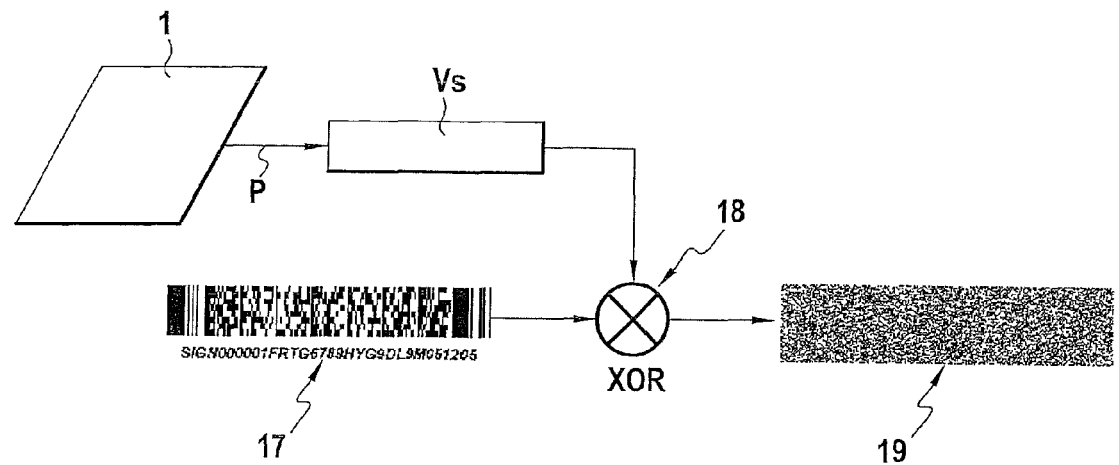

FIG. 17 illustrates one use of stable components Vs of a random signature generated from a subject material element 1 using the extraction method P of the invention, to ensure the protection of data such as traceability data for example 17 intended to be associated with a product.

For this type of use, the stable random signature Vs is used as one-time key in an encrypting process 18, of XOR type for example, to obtain from traceability data 17 securitized traceability data 19 which may be affixed to the product. For said use, the subject material element 1 at the origin of the stable random signature Vs may be joined to the product carrying the securitized information, in which case securitization will lie in the acquisition device which is to ensure decrypting of the securitized data 19. This securitization will be linked in particular to the decomposition base used, in the form of the acquisition window or the scanning path which may be kept secret and be known to the manufacturer alone of the acquisition device. Or on the contrary it could be contemplated that the subject material element at the origin of the stable random signature Vs is independent of the product and is held for example by the user in charge of verifying the authenticity of the product carrying the securitized data 19.

As mentioned previously, a random signature V generated using the extraction method of the invention, may comprise unstable components or may even only consist of unstable components, in which case it may be considered to use the extraction method of the invention as generator of random numbers.

The unstable components of the random signature may be used to generate one or more identifiers and/or one or more private keys, each being protected by stable random components, e.g. via one or more one-time pads.

Insofar as a random signature of the invention may comprise both stable components and unstable components, advantage may be drawn from this characteristic for various applications of which some non-exhaustive examples are given below.

Figure 18:
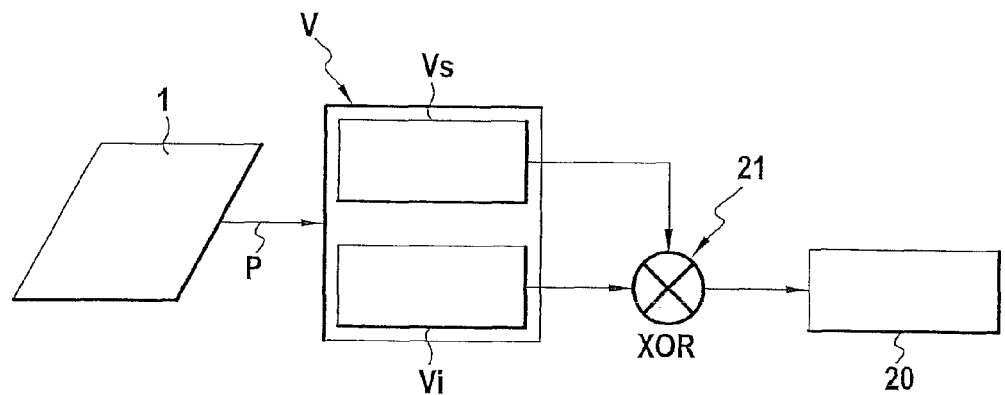

FIG. 18 illustrates an example of use of a random signature V, comprising stable components Vs and unstable components Vi, generated by the extraction method and, according to the invention, from a subject material element 1 in order to provide a securitized identifier 20. With this type of use, the unstable part Vi of a random signature V is used as identifier, whilst the stable part Vs is used as one-time key in an encrypting process 21, e.g. of XOR type, to obtain the securitized identifier 20. The holding of the subject material element 1 and of a device implementing the extraction method of the invention makes it possible to re-access the stable part Vs of the random signature V and hence to decrypt the securitized identifier 20 to access the initial identifier, in this case an unstable part Vi of a random signature V generated at the time of assignment of the identifier.

Figure 19:
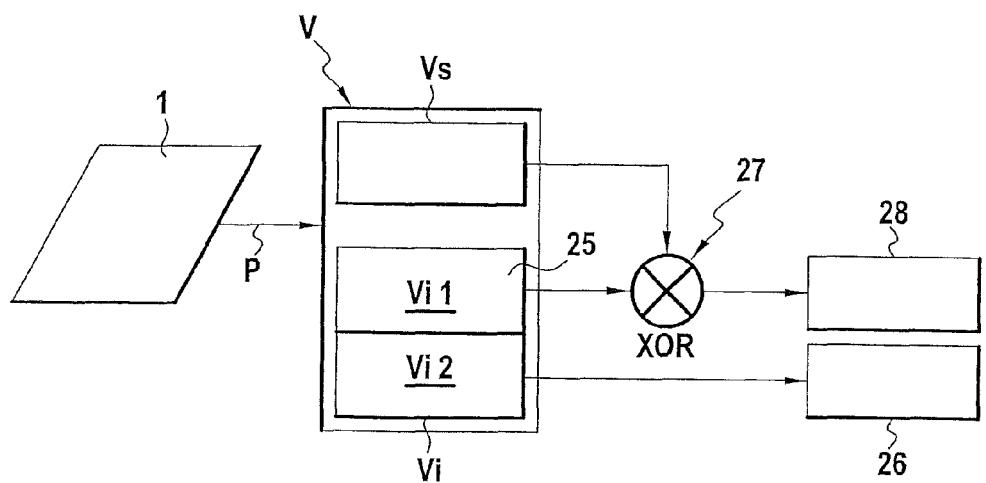

FIG. 19 illustrates another example of use of a random signature V, comprising stable components Vs and unstable components Vi, generated by the extraction method P of the invention from a subject material element 1 to provide public and private keys, even pairs of keys in an asymmetric cryptographic protocol. For this type of use, the extraction method P is implemented a first time to generate a random signature V of which part Vi1 of the unstable components is used as private key 25 whilst another part Vi2 of the unstable components is used as public key 26. Part of the stable components Vs is then used as one-time key in an encrypting process 27, e.g. of XOR type, to obtain from private key 25 a securitized private key 28. Holding of the subject material element 1 and a device implementing the extraction method of the invention then makes it possible to re-access the stable part Vs of the random signature V and hence to decrypt the securitized private key 28 to access the private key 25 generated during the first use of the inventive method P for extracting a random signature.

Figures 20, 21:
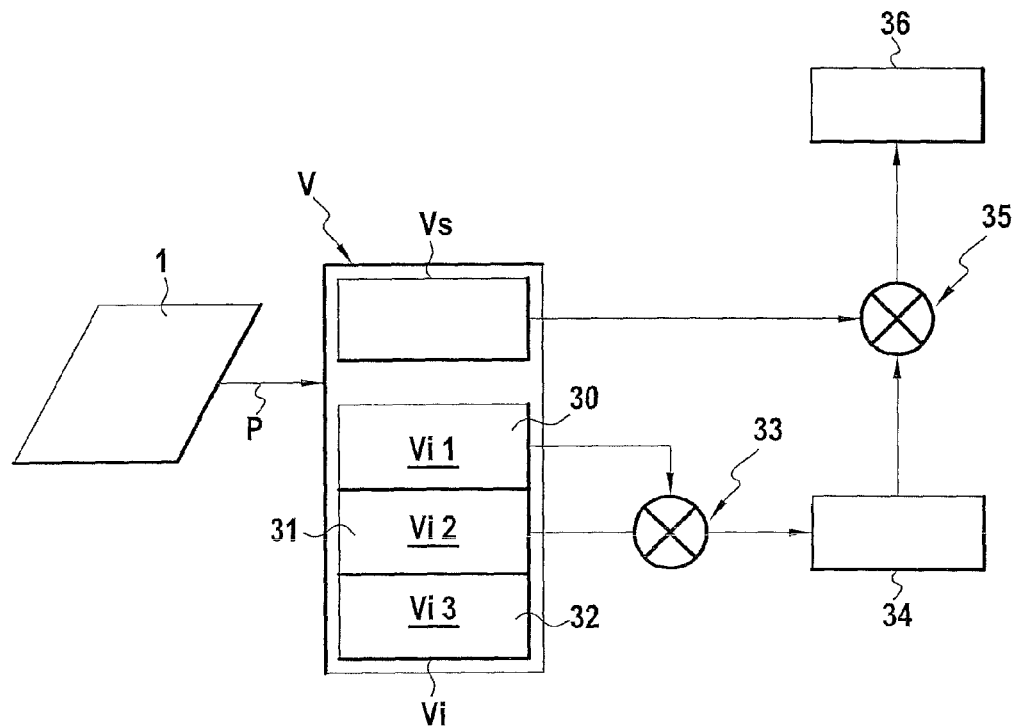

FIG. 20 illustrates another example of use of a random signature V, comprising stable components Vs and unstable components Vi, generated by the extraction method P of the invention from a subject material element 1 to provide firstly an identifier and secondly a one-time pad, and also public and private keys of an asymmetric cryptographic protocol. For this type of use, the extraction method P is used a first time to generate a random signature V of which one part Vi1 of the unstable components is used as identifier, a second part Vi2 of the unstable components is used as private key 31, whilst a third part Vi3 of the unstable components is used as public key 32. The private key 31 is then used in an enciphering process 33 to obtain from identifier 30 a signed or enciphered identifier 34. One part of the stable components Vs is then used as one-time key in an encrypting process 35, e.g. of XOR type, to obtain from signed identifier 34 a securitized signed identifier 36. Holding of the subject material element 1 and a device implementing the extraction method P of the invention then makes it possible to re-access the stable part Vs of the random signature V and hence to decrypt the securitized signed identifier 36 to access the signed identifier 34 generated during the first use of the inventive method P for extracting a random signature.

FIG. 21 illustrates one use of the inventive extraction method under the protocol for RSA encrypting with public key and private key. The random signature extracted from a subject material element is then used to generate the strong prime numbers p and q. Number n is the product pq. Number e is an integer chosen to be prime with $\phi(n)$ while d is chosen such that ed≡1 (mod $\phi(n)$). The private key Cs then consists of integers p, q and d while the public key consists of integers n and e. If the number referenced 40 is an identifier to be encrypted then the number referenced 41 is this identifier encrypted by means of the RSA protocol using the public Cp and private Cs keys above.

Evidently, the method for extracting a random signature according to the invention may comprise different phases using at least part of the stable and unstable components in various processes for generating at least one unique code and for ciphering this code.

Also, the methods of the invention may be used in many other applications without departing from the scope of the present invention.

The invention claimed is:

1. A method for generating a decomposition base which can be used to extract a random signature from a subject material element, comprising the following steps:

generating N acquisition vectors of structural characteristics of at least one region of an at least one material element separate from the subject material element and/or from the subject material element itself, analysing all the acquisition vectors using statistical methods to obtain the decomposition base formed of decomposition vectors enabling the representation of each acquisition vector in the form of an image vector of which each component corresponds to the contribution of a decomposition vector in the acquisition vector, analysing at least part of the decomposition vectors to identify that or those decomposition vectors, called common or certain contribution decomposition vectors, which will be at the origin of highly determinist and/or common components to all image vectors obtained using the decomposition base, and saving the decomposition base.

2. The method for generating a decomposition base as in claim 1, characterized in that analysis of the decomposition vectors comprises the following steps:

projecting each acquisition vector onto the decomposition base to obtain an image vector of which each component corresponds to the contribution of a decomposition vector in the acquisition vector, analysing at least part of the image vectors to identify that or those components which are highly determinist and/or common to all image vectors, the determinist components corresponding to decomposition vectors in the decomposition base called common or certain contribution decomposition vectors, the other components of an image vector being considered as random components.

3. The method for generating a decomposition base as in claim 1, characterized in that it is considered that a component has a highly determinist value if its value is predictable in relation to the type of material element.

4. The method for generating a decomposition base as in claim 1, characterized in that each acquisition vector is at least of two-dimensional nature.

5. The method for generating a decomposition base as in claim 1, characterized in that it comprises a removal step to remove common or certain contribution decomposition vectors from the decomposition base, and a step to save the reduced decomposition base, called decomposition base into random components.

6. The method for generating a decomposition base as in claim 1, characterized in that the step to generate acquisition vectors is made with at least one material element of the same family as the subject material element.

7. The method for generating a decomposition base as in claim 1, characterized in that the step to generate acquisition vectors comprises the following steps:

generating a number N of acquisitions, according to an acquisition window, of structural characteristics of at least one region of at least one material element separate from the subject material element and/or of the subject material element itself, digitizing, along a scanning path, each of the acquisitions into the form of an acquisition vector.

8. The method for generating a decomposition base as in claim 7, characterized in that it comprises a step to define the geometric characteristics of the acquisition window.

9. The method for generating a decomposition base as in claim 7, characterized in that it comprises a step to read the geometric characteristics of the acquisition window.

10. The method generating a decomposition base as in claim 7, characterized in that it comprises a step to save the geometric characteristics of the acquisition window.

11. The method for generating a decomposition base as in claim 7, characterized in that it comprises a step to define the characteristics of the scanning path.

12. The method for generating a decomposition base as in claim 7, characterized in that it comprises a step to read the characteristics of the scanning path.

13. The method Methed for generating a decomposition base as in claim 7, characterized in that it comprises a step to save the characteristics of the scanning path used for the digitization step.

14. The method for generating a decomposition base as in claim 1, characterized in that to obtain the decomposition base it uses an algorithm of Principal Component Analysis.

15. The method for generating a decomposition base as in claim 1, characterized in that to obtain the decomposition base it uses an algorithm of Independent Component Analysis.

16. The method Methed for generating a decomposition base as in claim 1, characterized in that for the identification of determinist components it uses a spectral decomposition algorithm and identification of the certain contribution decomposition vectors by filtering.

17. The method for generating a decomposition base as in claim 1, characterized in that each material element used is chosen from among: materials of dead biological origin, materials of organic origin, materials of mineral origin or materials obtained by mixture and/or composition and/or deposit of several of the preceding materials.

18. A method for extracting a random signature from a subject material element, comprising a phase to generate at least one acquisition vector of structural characteristics of at least one region of the subject material element, a phase to generate at least one random signature vector from the acquisition vector, the random signature vector comprising:

at least one random component having a stable nature so that its value may be found on each implementation of the method on one same region of the subject material element, ■ and/or at least one random component having an unstable nature so that its value is likely to vary random fashion on each implementation of the method on one same region of the subject material element, use of the random signature vector as random signature, the method further comprising application of a decomposition base, and before the random signature generating phase, a decomposition phase of each acquisition vector according to the decomposition base to obtain an image vector containing random components which each correspond to the contribution in the acquisition vector of a decomposition vector belonging to the decomposition base, and in that each component of the random signature vector is obtained by extraction of and/or processing at least one random component of at least one image vector, and further wherein the method for extracting a random signature comprises a phase to generate a decomposition base according to the method for generating a decomposition base as in claim 1.

19. The method for generating a decomposition base as in claim 1, further comprising saving a reading mask which, in the decomposition base, gives the position of any decomposition vectors at the origin of determinist components and/or the position of decomposition vectors at the origin of random components.

* * * * *